United States Patent
Stelter

(10) Patent No.: US 8,099,024 B2
(45) Date of Patent: Jan. 17, 2012

(54) SYSTEMS AND METHODS OF PRODUCING GRADIENT INDEX OPTICS BY SEQUENTIAL PRINTING OF TONERS HAVING DIFFERENT INDICES OF REFRACTION

(75) Inventor: Eric C. Stelter, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 434 days.

(21) Appl. No.: 12/403,439

(22) Filed: Mar. 13, 2009

(65) Prior Publication Data

US 2010/0232836 A1 Sep. 16, 2010

(51) Int. Cl.
*G03G 15/01* (2006.01)
(52) U.S. Cl. .................................... 399/231; 399/223
(58) Field of Classification Search .............. 399/223, 399/1, 222, 231
See application file for complete search history.

(56) References Cited

U.S. PATENT DOCUMENTS

| | | | |
|---|---|---|---|
| 5,715,383 A | 2/1998 | Schindler et al. | |
| 6,222,198 B1 | 4/2001 | Brown | |
| 6,259,567 B1 | 7/2001 | Brown et al. | |
| 6,340,821 B1 | 1/2002 | Brown | |
| 6,373,633 B1 | 4/2002 | Brown | |
| 6,613,498 B1 | 9/2003 | Brown et al. | |
| 6,760,508 B2 | 7/2004 | Karpinsky et al. | |
| 6,825,985 B2 | 11/2004 | Brown et al. | |
| 6,831,787 B1 | 12/2004 | Scarbrough et al. | |
| 6,861,363 B2 | 3/2005 | Harchanko et al. | |
| 6,875,695 B2 | 4/2005 | Harchanko et al. | |
| 6,881,358 B1 | 4/2005 | Clark et al. | |
| 6,891,502 B2 | 5/2005 | Harchanko | |
| 6,974,216 B2 | 12/2005 | Pezzaniti | |
| 7,009,789 B1 | 3/2006 | Brown | |
| 7,017,351 B2 | 3/2006 | Hao et al. | |
| 7,070,278 B2 | 7/2006 | Pezzaniti | |
| 7,139,521 B2 | 11/2006 | Ng et al. | |
| 7,145,721 B2 | 12/2006 | Banish et al. | |
| 7,468,820 B2 | 12/2008 | Ng et al. | |
| 7,502,582 B2 | 3/2009 | Ng et al. | |
| 7,831,178 B2 * | 11/2010 | Priebe et al. ............ 399/231 |
| 7,965,961 B2 * | 6/2011 | Priebe et al. ............ 399/231 |
| 2008/0159786 A1 | 7/2008 | Tombs et al. | |

FOREIGN PATENT DOCUMENTS

WO WO 02/076721 A1 10/2002
WO WO 2008/048553 A2 4/2008

OTHER PUBLICATIONS

Handbook of Optical Materials, 2003, CRC Press, Marvin J. Weber, Ph.D., Lawrence Berkeley National Laboratory, Section 3, Polymeric Materials, pp. 295-310.
Index Matching Using Optical Polymers, Jan. 8, 2003, Lightspan, NuSil Technology LLC.

* cited by examiner

*Primary Examiner* — Susan Lee
(74) *Attorney, Agent, or Firm* — Donna P. Suchy

(57) ABSTRACT

Systems and methods of producing image products using printing are provided. The image products are produced by sequentially applying a base image, a first clear toner and a second clear toner. The first clear toner forms one or more lenses, and the first and second clear toners have different indexes of refraction. The image products produced by the systems and methods can be lenticular image products that display different images depending upon a viewing angle.

21 Claims, 8 Drawing Sheets

SYSTEMS AND METHODS OF PRODUCING GRADIENT INDEX OPTICS BY SEQUENTIAL PRINTING OF TONERS HAVING DIFFERENT INDICES OF REFRACTION

FIELD OF THE INVENTION

This invention relates in general to printing, and more particularly to producing image products that include lenses using a single printing process.

BACKGROUND OF THE INVENTION

Lenticular image products are typically produced with a base image on a receiver member (e.g., a cut sheet of paper) and a substrate including lenticular lenses. FIG. 1A is a schematic side view, in cross section, of a typical lenticular image product. As illustrated in FIG. 1A, a typical lenticular image product includes a base image 102 comprising a plurality of interlaced images, in this case three images (i.e., image A, image B and image C). The base image 102 can be produced using any type of printing, including electrographic printing. A substrate including lenticular lenses 104 is typically produced in a process separate from the base image 102, and is then bonded to the base image in yet another process. As illustrated in FIG. 1A, depending upon the angle of viewing the resultant lenticular image product, the viewer sees one of three different images (i.e., image A, image B and image C).

Electrography is one common method for printing images on a receiver member. In this method, an electrostatic image is formed on a dielectric member by uniformly charging the dielectric member and then discharging selected areas of the uniform charge to yield an image-wise electrostatic charge pattern. Such discharge is typically accomplished by exposing the uniformly charged dielectric member to electromagnetic radiation provided by selectively activating particular light sources in an LED array or a laser device directed at the dielectric member. After the image-wise charge pattern is formed, the pigmented (or in some instances, non-pigmented) marking particles are given a charge and brought into the vicinity of the dielectric member with a suitable electric field applied so that the marling particles are attracted to the image-wise charge pattern to develop such pattern into a visible image.

Thereafter, a suitable receiver member (e.g., cut sheet of plain bond paper or plastic transparency material) is brought into juxtaposition with the marking particle developed image-wise charge pattern on the dielectric member. A suitable electric field is applied to transfer the marking particles to the receiver member in the image-wise pattern to form the desired print image on the receiver member. The receiver member is then removed from its operative association with the dielectric member and subjected to heat and/or pressure and/or solvent vapor to permanently fix the marking particle print image to the receiver member. Of course, plural marking particle images of, for example, different color particles respectively can be overlaid on one receiver member (before fixing) to form a multi-color print image on the receiver member.

SUMMARY OF THE INVENTION

In view of the above, this invention is directed to producing image products, including lenses, by electrographic techniques. The invention is also directed to apparatus for producing such lenticular image products and the resultant image products. An exemplary method comprises applying a base image to an image receiving surface. A first clear toner is applied on the base image to form a plurality a lenses. A second clear toner is applied on the plurality of lenses. The first and second clear toners have a different index of refraction.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1A:
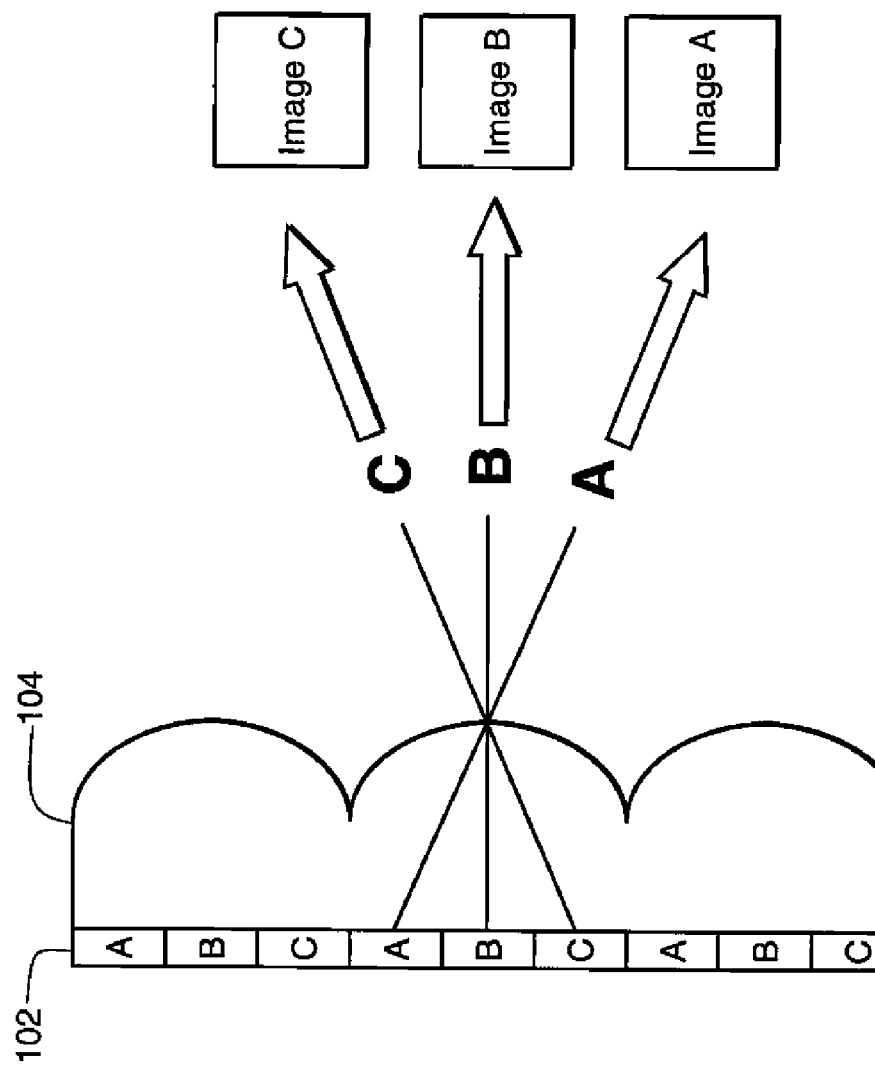
FIG. 1A is a schematic side view, in cross section, of a typical lenticular image product.
Figure 1B:
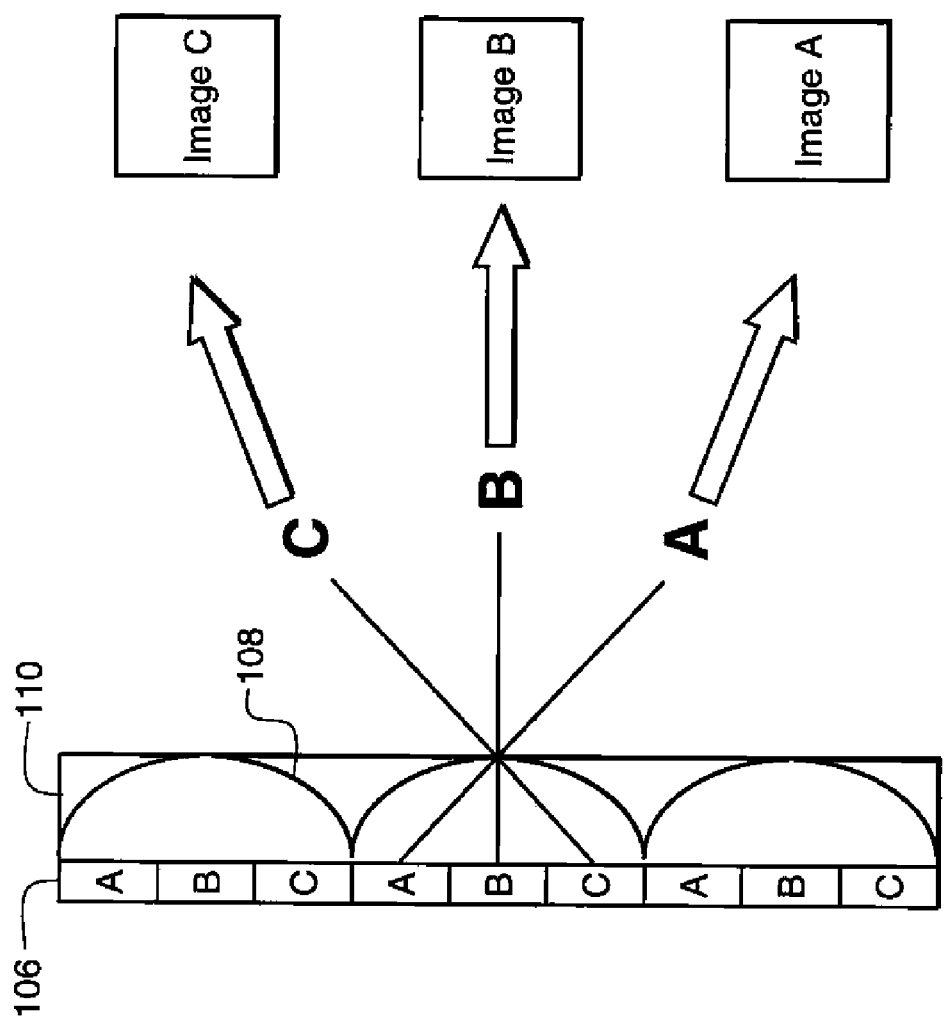
FIG. 1B is a schematic side view, in cross section of a lenticular image product formed in accordance with the present invention.

Referring now to FIG. 1B, an exemplary lenticular image product includes a base image 106 (including a plurality of interlaced images A, B, C), a first layer of clear toner 108 and a second layer of clear toner 110, all of which are formed on a suitable receiver member using, for example, electrographic techniques. The first and second layers of clear toner 108 and 110 are each composed of different materials such that each layer has a different index of refraction. These materials can be different types of plastic. Accordingly, as illustrated in FIG. 1B, the first layer of clear toner 108 forms a plurality of lenses (i.e., an array of lenticles) and the second layer of clear toner 110 forms a smooth surface for the resultant image product. The layer of clear toner 108 has a larger index of refraction than the layer of clear toner 110. The index of refraction or refractive index of a medium is the ratio of the velocities of light in a medium and in air under the same conditions. The refractive index is measured by the ratio of the sines of the angles of incidence and refraction and is determined by a conventional refractometer by conventional methods. Numerous references are available which provide the refractive index of various materials.

When the system uses a toner to create a layer with a large index of refraction, the toner can be made from a transparent, optically-clear polymer with a large index of refraction: such as a polyester with an n=1.65; polysulfone n=1.6; 3 or polycarbonate n=1.59. A layer with a low index of refraction can be made from a toner made from a transparent, optically-clear polymer with a small index of refraction: polymethyl methacrylate PMMA n=1.49; or CR-39 (allyl diglycol carbonate) n=1.45; or flouinated polymers PTFE n=1.32. These materials are similar to those used for contact lenses and plastic fiber optical cables. It is often important in this system to achieve a large relative difference in index of refraction between the high index of refraction toner and the low index of refraction toner. Suitable combinations of materials include polyester toner for the high index of refraction material and PMMA for the low index of refraction material, or PMMA for the high index of refraction material and fluorinated polymers for the low index of refraction material, or polyester toner for the high index of refraction material and PTFE for the low index of refraction material.

In one example the index of refraction of polyester, for example, can be increased by additives. For example 0 to about 20 weight parts of an additive which is miscible with the polyester can be used to increase the index of refraction so that the final composition remains substantially clear and transparent. Useful additives include specialized alkali metal-containing nucleating agents which provide high crystallization rates. The preferred crystallization nucleant is a polyester-based nucleant which is miscible with the PET base resin and comprises alkali metal salts of polyester polymers having a number average molecular weight of at least about 1,000. The most preferred polyester based nucleants are the sodium and potassium salts. Preferably, the "metal salt" polyester nucleating agent is formed first and then contacted with the polyester to be nucleated. Formation of the nucleating agent outside the PET is most preferred, since it provides relatively stable PET molecular weights.

Other useful nucleating agents include the sodium or potassium salts of carboxyl containing organic polymers, such as copolymers of olefins and acrylic or methacrylic acids, or copolymers of aromatic olefins and maleic anhydride. This class of nucleants includes the sodium or potassium salt of stearic acid; the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above, the olefin or aromatic olefin moiety ordinarily comprises 50-98 percent by weight of the copolymer, and preferably 80-98 percent.

Figure 2A:
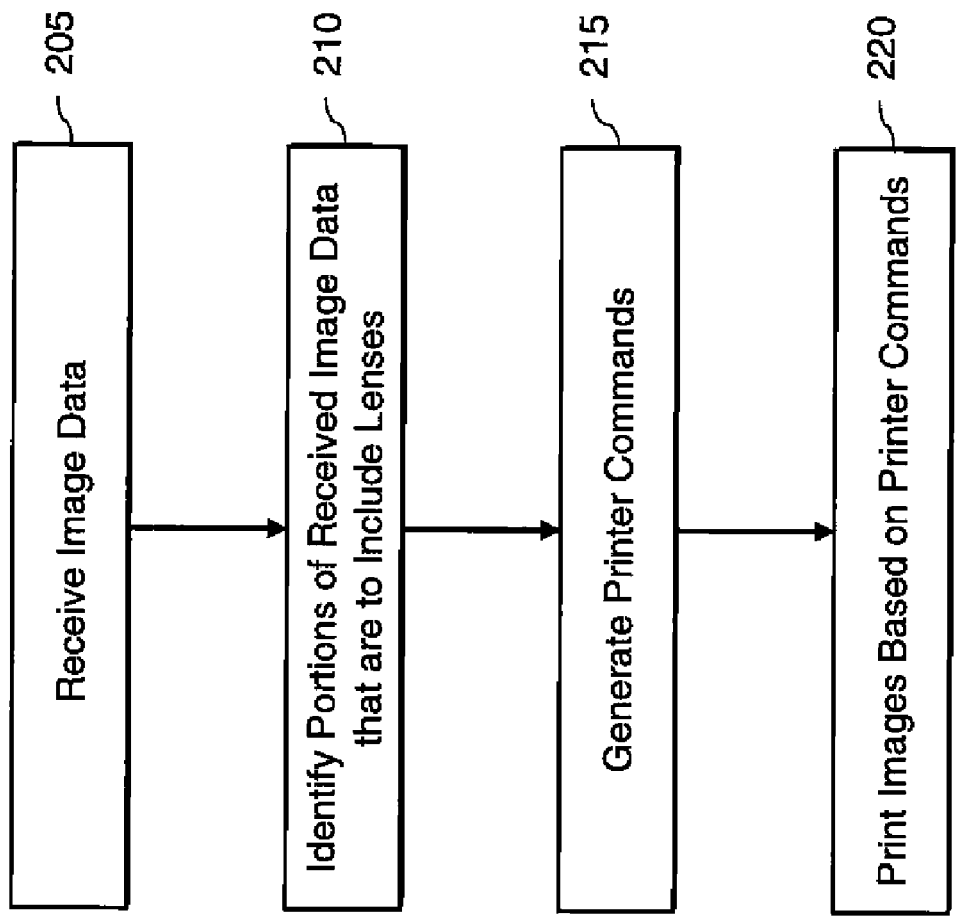
FIG. 2A is a flow chart illustrating an exemplary method in accordance with the present invention.

FIG. 2A is a flow chart illustrating an exemplary method in accordance with the present invention. Initially, image data is received (step 205) and portions of the received image data that are to include lenses are identified (step 210). For example, a letter, envelope or other printed product, can include portions that have lenticular images and portions that include regular images, and these different portions are identified for use in the printing process. Image commands are then generated based on the received image data and the portions that are to include lenses (step 215) and an image product is printed based on the printer commands (step 220). Steps 205-215 can be performed using a general purpose computer with a suitable printer driver or using specific purpose hardware and software (e.g., an application specific integrated circuit (ASIC) and/or a field programmable gate array (FPGA).

Figure 2B:
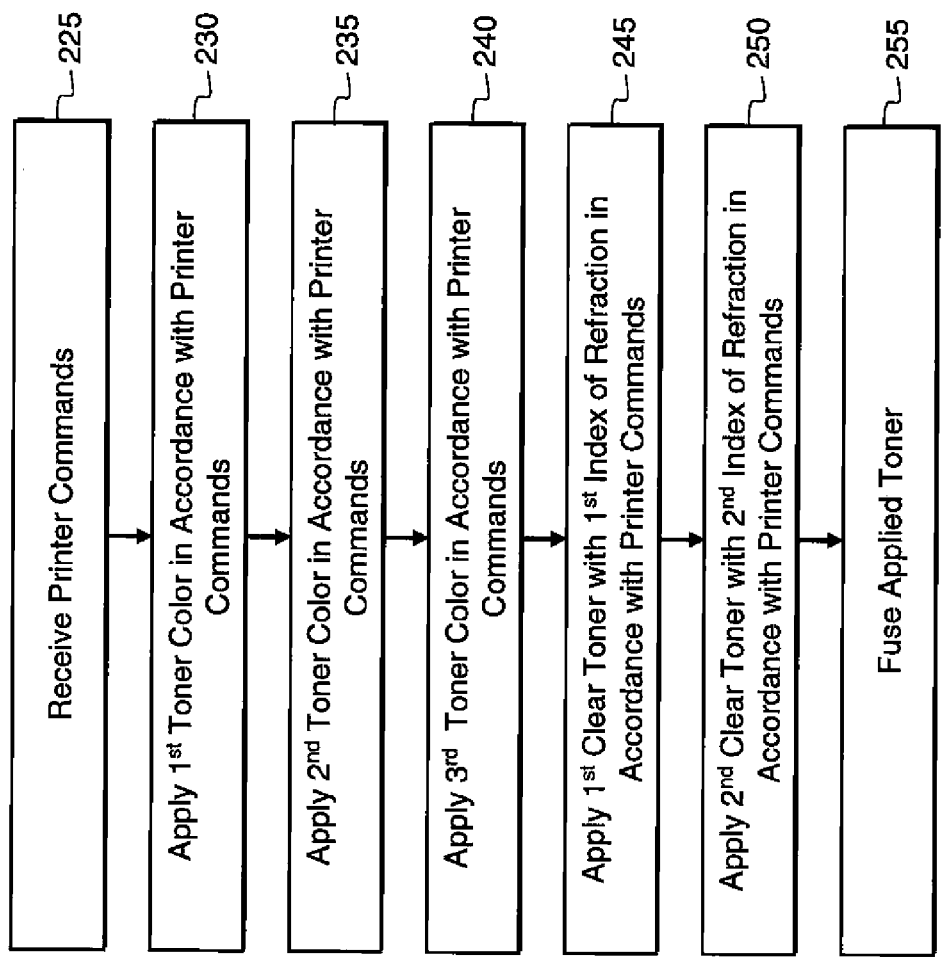
FIG. 2B is a flow chart illustrating another exemplary method in accordance with the present invention.

Step 220 is performed using a printer, and the printing process will be described in more detail in connection with FIG. 2B. Initially, the printing commands are received by the printer (step 225) and the first, second and third toner colors are successively applied to a suitable receiver member in accordance with the printer commands (steps 230-240). Next, a first clear toner with a first index of refraction is applied to the receiver member in accordance with the printer commands (step 245), and a second clear toner with a second index of refraction is then applied to the receiver member in accordance with the printer commands (step 250). Finally, the resultant image product is applied to a fuser in order to fuse the applied toner to the receiving member (step 255). Steps 220-255 can be performed using any type of processor in a printer, including an application specific integrated circuit (ASIC) and/or a field programmable gate array (FPGA).

The resulting image product can be any type of product, such as a multi-language packaging, warning labels, motion imaging in posters, children's books, compact disc (CD) or digital versatile disc (DVD) cases, trading cards, mouse pads, counter displays, key rings, framed pictures and/or the like.

The first clear toner has a higher index of refraction than the second clear toner, and the first and second clear toners are applied to the receiving member using gray-scale printing. For example, to make gradient index lenses (GRIN) with the index of refraction greatest in the center and decreasing radially from the center, the first clear toner is applied with its thickest deposit in the center of the lens and the thinnest at the edge of the lens using gray-scale exposures. To form a smooth surface for the resultant image product, the second clear toner would be applied using an inverse of the gray-scale of the first clear toner, thereby filling the low points of the lenses. The second clear toner can also be applied with an additional offset, such that there is a portion of the second clear toner above the center of the lenses, in addition to filling the low points of the lenses. Due to the greater index of refraction for the first clear toner compared with the second clear toner, the resulting lenses will have a high average index of refraction in the center of the lens and a low index of refraction at the edges. The resulting lenses can have any shape, such as a parabolic shape. For a planar lens or a lens array, the fused image is passed through a glosser. The raised surface for the lenses can be achieved using the techniques disclosed in U.S. Publication No. 2008/0159786, published Jul. 3, 2008, in the names of Thomas N. Tombs et al., the entire disclosure of which is herein expressly incorporated by reference.

The present invention can be employed to make other types of gradient index lenses, including axial gradient index lenses (AGRIN) in which the index varies along the optical axis of the lens or through the thickness of the lens. Using the first and second clear toners with different indexes of refraction allows for gradient index lenses with less curvature compared to conventional glass lenses. The present invention can also be employed to form lenses with irregular surfaces, such as Fresnel lenses.

The lenses can be formed using the background texture generating techniques described in U.S. Pat. No. 7,468,820 issued on Dec. 23, 2008, in the name of Yee S. Ng et al. and/or the inverse mask technique of U.S. Pat. No. 7,139,521, issued Nov. 21, 2006, in the name of Yee S. Ng et al., the entire disclosures of which are herein expressly incorporated by reference.

Although the invention is described as forming an array of small lenses or lenslets, the invention can be used to make a single lens. Moreover, although the invention is described as forming the lenses on top of a base image, one or more lenses can be formed using the invention without the base image. This is useful for lens arrays for liquid crystal (LCD) and organic light emitting diode (OLED) displays, wide-screen displays and the like. In this case the lens array can be formed using electrographic printing techniques on a clear receiving member and then overlaid on an active matrix of pixels of the display device.

Figure 1C:
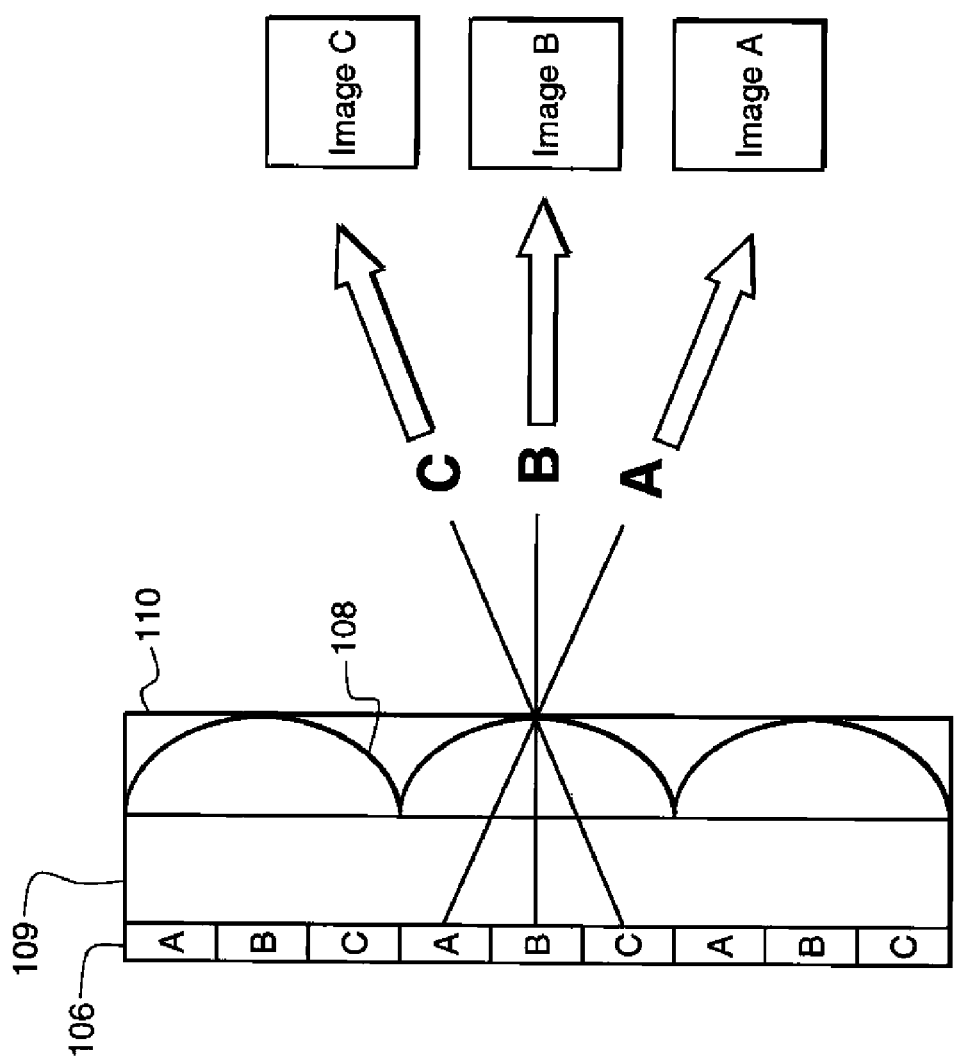
FIG. 1C is a schematic side view, in cross section of a lenticular image product formed in accordance with the present invention.

Additionally, although the invention is described as forming the lenses on top of a base image, one or more lenses can be formed on a transparent layer 109 as shown in FIG. 1C, that is already laminated to the base image, or can be laminated to an image in a subsequent process step. In this case, it is preferable that transport layer 109 have a similar index of refraction to clear toner 108. For example, if clear toner 108 is polyester, the transparent layer 109 is preferably polyester sheet, such as mylar. In one embodiment the transparent layer can be formed by laying down a layer of transparent toner between the image and the lens using the EP printer.

The resulting lens array can be fixed to the receiver member by heat and/or pressure and/or solvent vapor. Fusing a web or roller is known in the electrophotographic art. Oven fusing can also be used. Solvent or vapor fusing as is known in the art can also be used. Suitable solvents include 1,3-dioxolane (Ferro), methylene chloride, esters, ethyl acetate, amyl acetate, benzene, toluene, and chloroform. After fusing, the image can be passed through a ferrotyper or glosser, such as the Kodak NexPress glosser.

Figure 3:
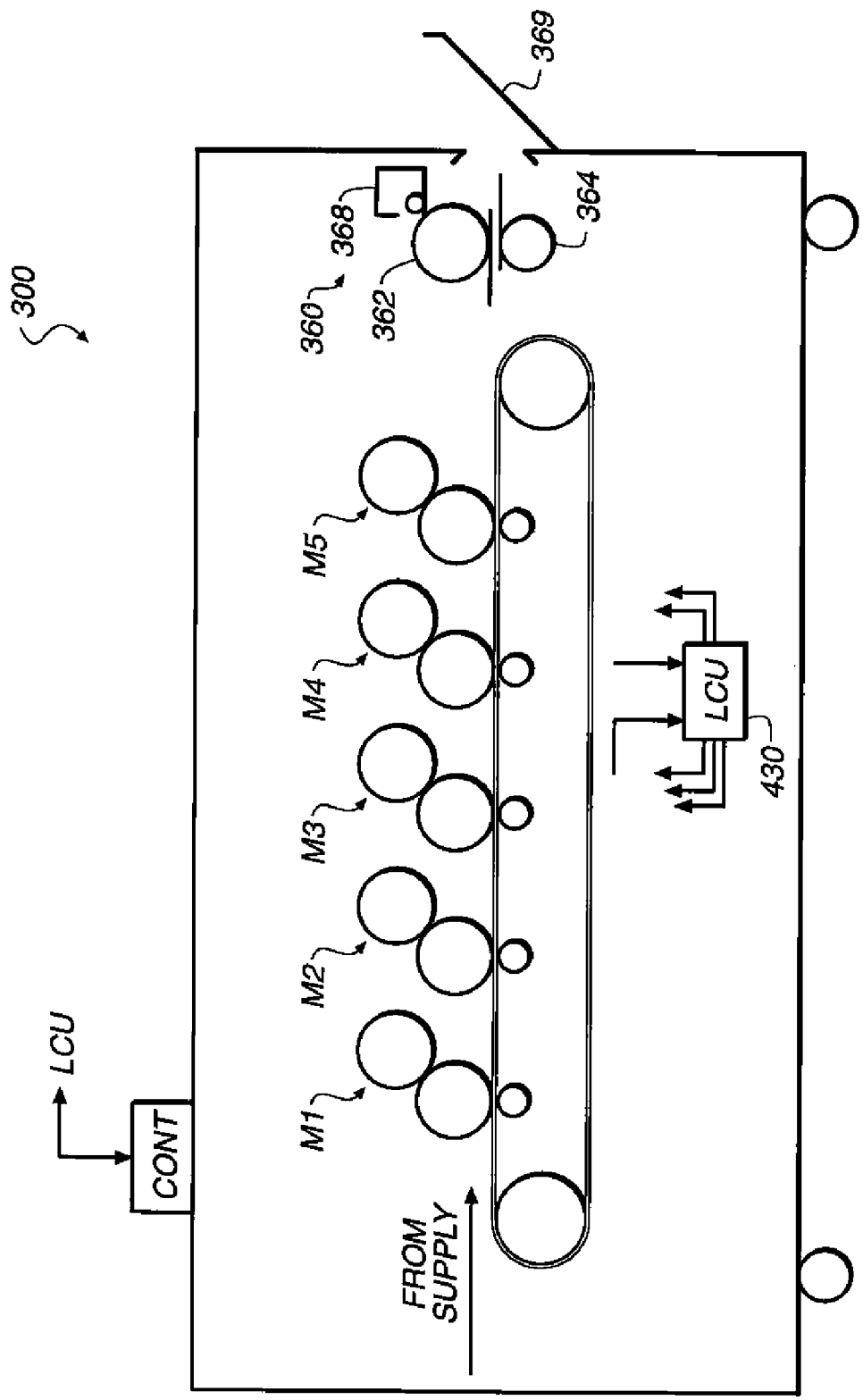
FIG. 3 is a schematic side elevational view, in cross section, of a typical electrographic reproduction apparatus suitable for use with this invention.
Figure 4:
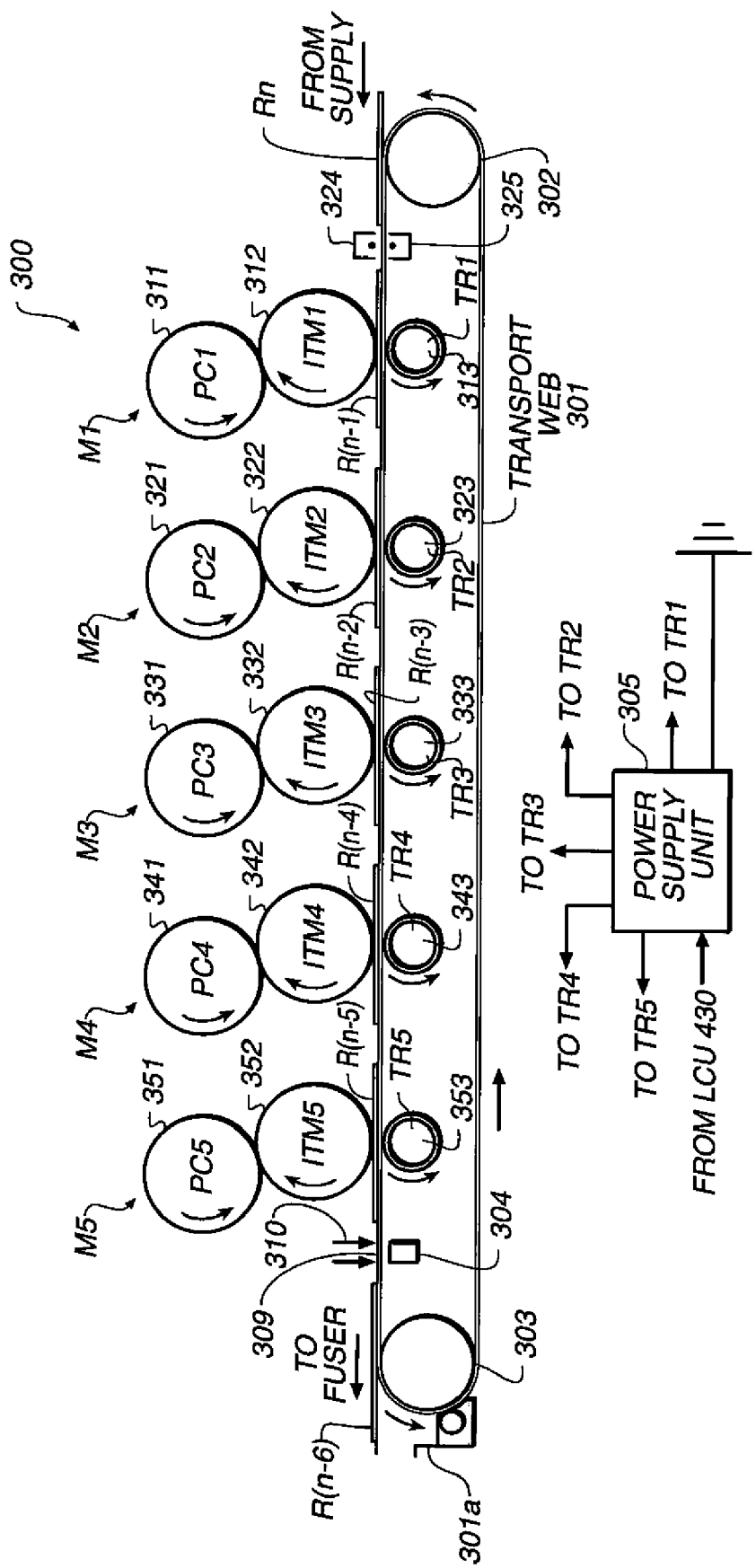
FIG. 4 is a schematic side elevational view, in cross section, of the reprographic image-producing portion of the electrographic reproduction apparatus of FIG. 3, on an enlarged scale.
Figure 5:
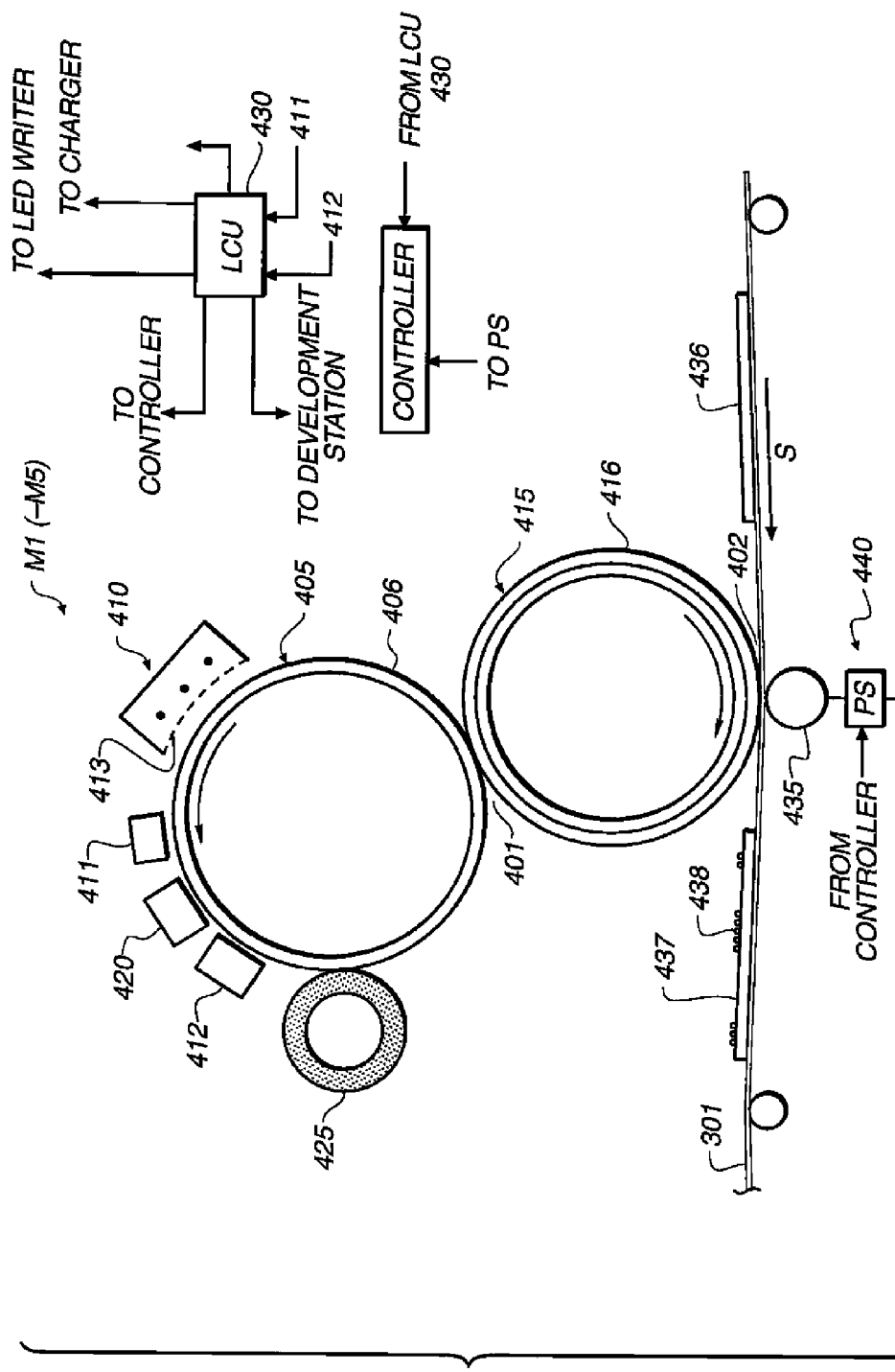
FIG. 5 is a schematic side elevational view, in cross section, of one printing module of the electrographic reproduction apparatus of FIG. 3, on an enlarged scale.

Now that a high level description of the invention has been provided, a more detailed description of the implementation in an electrostatic printer is presented in connection with FIGS. 3-5, which are side elevational views schematically showing portions of a typical electrographic print engine or printer apparatus suitable for printing of pentachrome images. Although one embodiment of the invention involves printing using an electrophotographic engine having three sets of single color image producing or printing stations or modules arranged in tandem, the invention contemplates that more or less than three colors may be combined on a single receiver member, or may include other typical electrographic writers or printer apparatus.

An electrographic printer apparatus 300 has a number of tandemly arranged electrostatographic image forming printing modules M1, M2, M3, M4, and M5. Each of the printing modules M1-M3 generates a single-color toner image and each of printing modules M4 and M5 includes a clear toner for transfer of clear images to a receiver member successively moved through the modules. Printing module M4 generates an image that forms one or more lenses and printing module M5 generates an image that forms a smooth surface for the resultant image product. Each receiver member, during a single pass through the three modules M1-M5, can have transferred in registration thereto up to three single-color toner images (which form a process color image) and two clear toner images, each clear toner image having a different index of refraction. As used herein the term process color implies that in an image formed on a receiver member combinations of subsets of the three colors are combined to form other colors on the receiver member at various locations on the receiver member, and that all three colors participate to form process colors in at least some of the subsets wherein each of the three colors may be combined with one or more of the other colors at a particular location on the receiver member to form a color different than the specific color toners combined at that location. In a particular embodiment, printing modules M1-M3 can each form color separation images using any combination of colors, such as cyan (C), magenta (M) and yellow (Y); red (R), green (G) and blue (B); and/or the like. These colors can be arranged in any order.

Receiver members ($R_n$-$R_{(n-6)}$ as shown in FIG. 4) are delivered from a paper supply unit (not shown) and transported through the printing modules M1-M5. The receiver members are adhered (e.g., preferably electrostatically via coupled corona tack-down chargers 324, 325) to an endless transport web 301 entrained and driven about rollers 302, 303. Each of the printing modules M1-M5 similarly includes a photoconductive imaging roller, an intermediate transfer member roller, and a transfer backup roller. Thus in printing module M1, a first color toner separation image can be created on the photoconductive imaging roller PC1 (311), transferred to intermediate transfer member roller ITM1 (312), and transferred again to a receiver member moving through a transfer station, which transfer station includes ITM1 forming a pressure nip with a transfer backup roller TR1 (313). Similarly, printing modules M2, M3, M4, and M5 include, respectively: PC2, ITM2, TR2 (321, 322, 323); PC3, ITM3, TR3 (331, 332, 333); PC4, ITM4, TR4 (341, 342, 343); and PC5, ITM5, TR5 (351, 352, 353). A receiver member, $R_n$, arriving from the supply, is shown passing over roller 302 for subsequent entry into the transfer station of the first printing module, M1, in which the preceding receiver member $R_{(n-1)}$ is shown. Similarly, receiver members $R_{(n-2)}$, $R_{(n-3)}$, $R_{(n-4)}$, and $R_{(n-5)}$ are shown moving respectively through the transfer stations of printing modules M2, M3, M4, and M5. An unfused image formed on receiver member $R_{(n-6)}$ is moving as shown towards a fuser of any well known construction, such as the fuser assembly 360 (shown in FIG. 3).

A power supply unit 305 provides individual transfer currents to the transfer backup rollers TR1, TR2, TR3, TR4, and TR5 respectively. A logic and control unit 430 (FIG. 3) includes one or more computers and in response to signals from various sensors associated with the electrophotographic printer apparatus 300 provides timing and control signals to the respective components to provide control of the various components and process control parameters of the apparatus in accordance with well understood and known employments. A cleaning station 301a for transport web 301 is also typically provided to allow continued reuse thereof.

With reference to FIG. 5 wherein a representative printing module (e.g., M1 of M1-M5) is shown, each printing module of the electrographic printer apparatus 300 includes a plurality of electrographic imaging subsystems for producing a single color toned image or a clear image (in the case of M4 and M5). Included in each printing module is a primary charging subsystem 410 for uniformly electrostatically charging a surface 406 of a photoconductive imaging member (shown in the form of an imaging cylinder 405). An exposure subsystem 420 is provided for image-wise modulating the uniform electrostatic charge by exposing the photoconductive imaging member to form a latent electrostatic color separation image of the respective color. A development station subsystem 425 serves for toning the image-wise exposed photoconductive imaging member with toner of a respective color (or clear toner). An intermediate transfer member 415 is provided for transferring the respective color separation image (or clear toner separation image) from the photoconductive imaging member through a transfer nip 401 to the surface 416 of the intermediate transfer member 415 and from the intermediate transfer member 415 to a receiver member (receiver member 436 shown prior to entry into the transfer nip and receiver member 437 shown subsequent to transfer of the toned color or clear separation image) which receives the respective toned color separation images and the clear separation images in superposition to form a composite multicolor image and lens array thereon.

Subsequent to transfer of the respective color separation images, overlaid in registration, one from each of the respective printing modules M1-M5, the receiver member is advanced to a fusing assembly to fuse the multicolor and clear toner image to the receiver member. Additional necessary components provided for control may be assembled about the various process elements of the respective printing modules (e.g., a meter 411 for measuring the uniform electrostatic charge, a meter 412 for measuring the post-exposure surface potential within a patch area of a patch latent image formed from time to time in a non-image area on surface 406, etc). Further details regarding the electrographic printer apparatus 300 are provided in U.S. Pat. No. 7,502,582, issued on Mar. 10, 2009, in the name of Yee S. Ng et al.

Associated with the printing modules 400 is a main printer apparatus logic and control unit (LCU) 430, which receives input signals from the various sensors associated with the printer apparatus and sends control signals to the chargers 410, the exposure subsystem 420 (e.g., LED writers), and the development stations 425 of the printing modules M1-M5. Each printing module may also have its own respective controller coupled to the printer apparatus main LCU 430

Subsequent to the transfer of the three color toner separation images and two clear toner separation images in superposed relationship to each receiver member, the receiver member is then serially de-tacked from transport web 301 and sent in a direction to the fusing assembly 360 to fuse or fix the dry toner images to the receiver member. The transport web is then reconditioned for reuse by cleaning and providing charge to both surfaces 324, 325 (see FIG. 4) which neutralizes charge on the opposed surfaces of the transport web 301.

The electrostatic image is developed by application of pigmented (or non-pigmented) marking particles (toner) to the latent image bearing photoconductive drum by the respective development station 425. Each of the development stations of the respective printing modules M1-M5 is electrically biased by a suitable respective voltage to develop the respective latent image, which voltage may be supplied by a power supply or by individual power supplies (not illustrated). Preferably, the respective developer is a two-component developer that includes toner marking particles and magnetic carrier particles. Each color development station has a particular color of pigmented toner marking particles associated respectively therewith for toning or a clear toner (i.e., non-pigmented) respectively associated therewith. Thus, each of the five modules creates a different color marking particle image or a clear toner image on the respective photoconductive drum.

With further reference to FIG. 3, transport belt 301 transports the toner image carrying receiver members to a fusing or fixing assembly 360, which fixes the toner particles to the respective receiver members by the application of heat and pressure. More particularly, fusing assembly 360 includes a heated fusing roller 362 and an opposing pressure roller 364 that form a fusing nip therebetween. Fusing assembly 360 also includes a release fluid application substation generally designated 368 that applies release fluid, such as, for example, silicone oil, to fusing roller 362. The receiver members carrying the fused image are transported seriatim from the fusing assembly 360 along a path to either a remote output tray, or is returned to the image forming apparatus to create an image on the backside of the receiver member (form a duplex print).

The logic and control unit (LCU) 430 includes a microprocessor incorporating suitable look-up tables and control software, which is executable by the LCU 430. The control software is preferably stored in memory associated with the LCU 430. Sensors associated with the fusing assembly provide appropriate signals to the LCU 430. In response to the sensors, the LCU 430 issues command and control signals that adjust the heat and/or pressure within fusing nip 366 and otherwise generally nominalizes and/or optimizes the operating parameters of fusing assembly 360 for imaging substrates.

Inage data for writing by the printer apparatus 300 may be processed by a raster image processor (RIP), which may include a color separation screen generator or generators. The output of the RIP may be stored in frame or line buffers for transmission of the color separation print data to each of respective LED writers Y, M, and C (which stand for yellow, magenta, and cyan, respectively). The RIP and/or color separation screen generator may be a part of the printer apparatus or remote therefrom. Image data processed by the RIP may be obtained from a color document scanner or a digital camera or generated by a computer or from a memory or network which typically includes image data representing a continuous image that needs to be reprocessed into halftone image data in order to be adequately represented by the printer. The RIP may perform image processing processes including color correction, etc. in order to obtain the desired color print. Color image data is separated into the respective colors and converted by the RIP to halftone dot image data in the respective color using matrices, which comprise desired screen angles and screen rulings. The RIP may be a suitably programmed computer and/or logic devices and is adapted to employ stored or generated matrices and templates for processing separated color image data into rendered image data in the form of halftone information suitable for printing.

The invention has been described in detail with particular reference to certain preferred embodiments thereof, but it will be understood that variations and modifications can be effected within the spirit and scope of the invention.

The invention claimed is:

1. A method of producing an image product, the method comprising:
   applying a base image to an image receiving surface;
   applying a first clear toner on the base image to form a plurality of lenses; and
   applying a second clear toner on the plurality of lenses,
   wherein the first and second clear toners have a different index of refraction.

2. The method of claim 1, wherein the base image includes a plurality of interlaced images.

3. The method of claim 2, wherein the plurality of lenses are lenticles produced in register with the interlaced images.

4. The method of claim 1, wherein the plurality of lenses are gradient index lenses with an index of refraction higher in a center of each of the lenses and an index of refraction that decreases radially from the center.

5. The method of claim 1, wherein the base image further comprises a transparent layer between the image and the lenses.

6. The method of claim 1, further comprising:
   fusing the base image and first and second clear toners to form a resulting image.

7. The method of claim 6, wherein the second clear toner is applied to the plurality of lenses in such a way that, after fusing, the resulting image has a substantially flat surface.

8. The method of claim 1, wherein the base image is applied to a first portion of the image receiving surface, the method further comprising:
   applying a second image to a second portion of the image receiving surface.

9. The method of claim 8, wherein the second clear toner is applied to the second portion of the image receiving surface.

10. The method of claim 1, wherein the first and second clear toners include plastic.

11. A method of producing an image product, the method comprising:
   receiving printer commands, and in response to the printer commands the method comprises controlling a first print module to apply a base image to an image receiving surface;

controlling a second print module to apply a first clear toner on the base image to form a plurality of lenses; and controlling a third print module to apply a second clear toner on the plurality of lenses, wherein the first and second clear toners have a different index of refraction.

12. The method of claim 11, wherein the base image includes a plurality of interlaced images.

13. The method of claim 12, wherein the plurality of lenses are lenticles produced in register with the interlaced images.

14. The method of claim 11, wherein the plurality of lenses are gradient index lenses with an index of refraction higher in a center of each of the lenses and an index of refraction that decreases radially from the center.

15. The method of claim 11, wherein the first print module include a plurality of print modules, each associated with a different color toner, and the control of the first print module includes controlling each of the plurality of print modules to sequentially apply the different color toner.

16. The method of claim 11, wherein in response to the printer command the method comprises controlling a fusing of the base image and first and second clear toners to form a resulting image.

17. The method of claim 16, wherein the second clear toner is applied to the plurality of lenses in such a way that, after fusing, the resulting image has a substantially flat surface.

18. The method of claim 11, wherein the base image is applied to a first portion of the image receiving surface, the method further comprising:

applying a second image to a second portion of the image receiving surface.

19. The method of claim 18, wherein the second clear toner is applied to the second portion of the image receiving surface.

20. The method of claim 11, wherein the first and second clear toners include plastic.

21. The method of claim 18, the base image further including a transparent layer over the base image.

* * * * *